(12) United States Patent
Payne et al.

(10) Patent No.: US 6,423,438 B1
(45) Date of Patent: Jul. 23, 2002

(54) METHOD FOR SEALING BATTERY CONTAINER

(75) Inventors: Robert Payne, Wellesley; Gary M. Searle, Norfolk, both of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/494,586

(22) Filed: Jan. 31, 2000

(51) Int. Cl.$^7$ ................................................. H01M 2/00
(52) U.S. Cl. ........................ 429/34; 429/27; 429/163; 429/164; 429/165; 429/166; 429/170; 429/172; 429/175; 429/176; 429/185; 429/186
(58) Field of Search ................................. 429/163, 164, 429/165, 166, 170, 172, 175, 176, 186, 185, 27, 34

(56) References Cited

U.S. PATENT DOCUMENTS

| | | |
|---|---|---|
| 1,481,145 A | 1/1924 | Pepper |
| 1,908,194 A | 5/1933 | Stone |
| 2,346,640 A | 4/1944 | Anthony |
| 2,419,244 A | 4/1947 | Anthony |
| 2,481,539 A | 9/1949 | Ruben |
| 3,554,813 A | 1/1971 | Feldhake |
| 3,859,141 A | 1/1975 | Strauss et al. |
| 3,881,959 A | 5/1975 | Tsuchida et al. |
| 3,963,519 A | 6/1976 | Louie |
| 4,052,533 A | 10/1977 | Heinz, Jr. |
| 4,112,198 A | 9/1978 | Przybyla et al. |
| 4,469,764 A | 9/1984 | Schumm, Jr. |
| 4,523,376 A | 6/1985 | Thibault et al. |
| 4,656,736 A | 4/1987 | Volkhin et al. |
| 5,080,984 A | 1/1992 | Thibault et al. |
| 5,150,602 A | 9/1992 | Payne et al. |
| 5,342,712 A | 8/1994 | Mieczkowska et al. |
| 5,478,669 A | 12/1995 | Flack |
| 5,490,867 A | 2/1996 | Kozawa et al. |
| 5,518,834 A | 5/1996 | Yoshizawa et al. |
| 5,569,564 A | 10/1996 | Swierbut et al. |
| 5,588,970 A | 12/1996 | Hughett et al. |
| 5,688,294 A | 11/1997 | Mizuno et al. |
| 5,712,058 A | 1/1998 | Malay |
| 5,738,952 A | 4/1998 | Abe |
| 5,846,672 A | 12/1998 | Bennett |
| 6,232,007 B1 * | 5/2001 | Payne et al. .................. 429/27 |
| 6,265,104 B1 * | 7/2001 | Hull et al. .................. 429/185 |

FOREIGN PATENT DOCUMENTS

| | | |
|---|---|---|
| EP | 0 940 866 A2 | 6/1999 |
| EP | 0 940 869 A2 | 6/1999 |
| EP | 0 940 870 A2 | 9/1999 |
| EP | 0 940 871 A2 | 9/1999 |
| EP | 0 940 872 A2 | 9/1999 |
| EP | 0 940 873 A2 | 9/1999 |
| EP | 0 940 874 A2 | 9/1999 |
| EP | 0 940 875 A2 | 9/1999 |
| JP | 591984-99656 | 6/1984 |
| JP | 5-047388 | 2/1993 |
| JP | 08-162173 | 6/1996 |
| JP | 08-306398 | 11/1996 |
| JP | 8-161382 | 1/1998 |

* cited by examiner

Primary Examiner—Gabrielle Brouillette
Assistant Examiner—Angela J. Martin

(57) ABSTRACT

A method of sealing an end of a battery container is disclosed. The method includes: (a) providing a plurality of supports in a wall of the container toward the end of the container; (b) scoring the wall of the container at a position between the end of the container and the supports; (c) inserting a top assembly into the container such that the top assembly contacts the supports; and (d) folding an edge of the container over the top assembly.

15 Claims, 7 Drawing Sheets

METHOD FOR SEALING BATTERY CONTAINER

BACKGROUND OF THE INVENTION

The invention generally relates to a method for sealing a battery container.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal-air electrochemical cell, oxygen is reduced at the cathode, and a metal is oxidized at the anode. Oxygen is supplied to the cathode from the atmospheric air external to the cell through one or more air access port(s) in the cell container.

A cylindrical metal-air battery can be assembled by inserting a cathode, a separator, and an anode into a battery container. The end of the container is then sealed. During the sealing process, force must be applied to the container to seal the end. If this force is transferred to the cathode, the cathode can be deformed. When this occurs, electrolyte can sometimes leak from the cell.

SUMMARY OF THE INVENTION

The invention features methods for sealing battery containers that minimize damage to the cathode. The invention also features batteries made using these methods.

In one aspect, the invention features a method of sealing an end of a battery container. The method includes: (a) providing a plurality of supports in a wall of the container toward the end of the container; (b) scoring the wall of the container at a position between the end of the container and the supports; (c) inserting a top assembly into the container such that the top assembly contacts the supports; and (d) folding an edge of the container over the top assembly. The supports can be formed, e.g., by half-shearing, lancing, or swaging portions of the container wall.

The supports provide flat surfaces, or "shelves," that prevent the top assembly from being pushed so far into the battery container that it contacts the top of the cathode. It is preferred that the top assembly is not pushed against the cathode, because when this happens, the cathode can buckle. When the cathode is buckled or deformed, electrolyte can sometimes leak out of the battery.

In another aspect, the invention features a metal-air battery having a positive end and a negative end that includes: (a) a container having a plurality of louvers including leaves, wherein at least three of the louvers have ends located toward an end of the battery; (b) an anode; (c) a cathode; (d) a separator between the anode and the cathode; and (e) a top assembly in contact with a plurality of supports in the wall of the container.

In this battery, the louvers promote air circulation across the cathode surface; the supports minimize the damage to the cathode. Without the supports, the top assembly can be seated improperly, which in turn can result in damage to the cathode and/or electrolyte leakage from the battery during storage and use.

As used herein, "toward" means at a position on a member, relative to a given point on that member, within 20% more preferably 10% or 5%, of the total length of the member. A feature located "toward" an end of a container having a length of 10 cm is within 2 cm of that end of the container, and is preferably within 1 cm or 0.5 cm from the end.

As used herein, a "top assembly" means any member for a metal-air battery that includes a cavity that can accommodate a cathode, an end cap that can form an end surface of a battery container, a current collector, and means for engaging a support on the wall of the battery container.

Other features and advantages of the invention will be apparent from the description of the preferred embodiment thereof, and from the claims.

DESCRIPTION OF THE PREFERRED EMBODIMENTS

The invention features methods for sealing the ends of batteries while minimizing damage to the cathodes of the batteries.

The containers of the invention can be prepared, for example, as follows. Disks are cut from plates of nickel-plated cold-rolled steel. Containers of the desired shape and size (e.g., cylindrical containers for AAAA, AAA, AA, C, or D batteries) are then deep drawn from these disks.

Figure 1A:
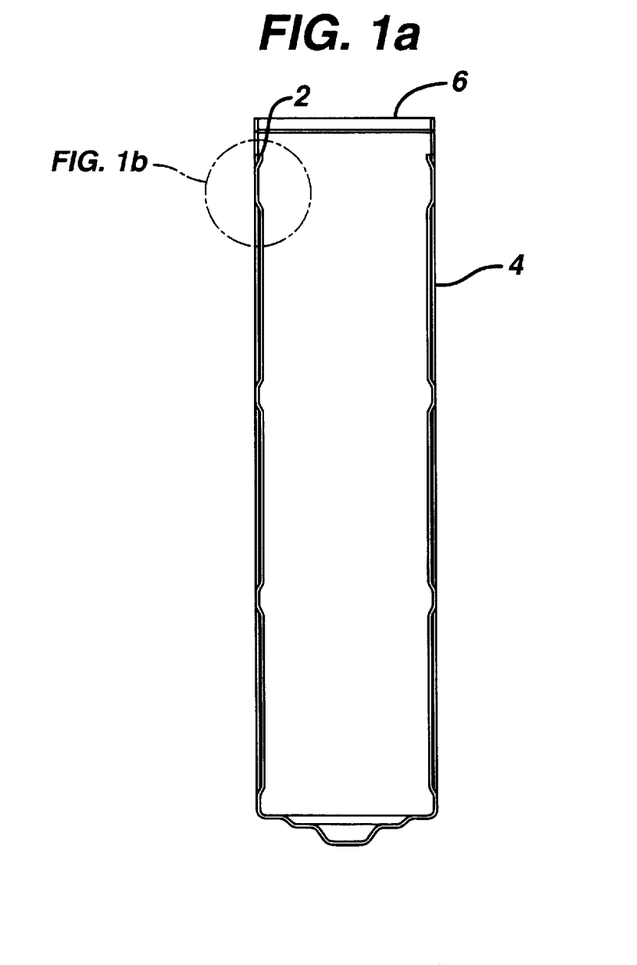
FIGS. 1a and 1b are cross-sectional views of a battery container with half-sheared supports.
Figure 1B:
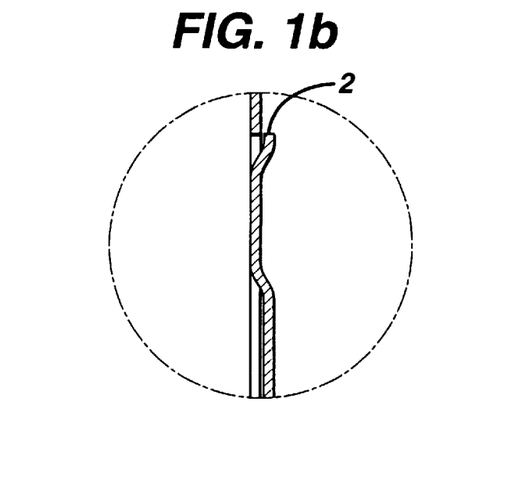

The container is machined to provide supports for the top assembly of the battery. For example, half-sheared or lanced surfaces 2 can be punched into the wall 4 of the container toward the negative end 6 of the container, as shown in FIG. 1a. FIG. 1b shows an expanded view of a half-sheared surface. The portion of the half-sheared surface that juts into the interior of the can provides a "shelf" on which the top assembly can rest. This surface prevents the top assembly from being pushed too far into the battery can. For a AAA battery container, the supports can be located 5.5 mm from the end of the finished, sealed container (i.e., 5.5 mm from the surface of the end cap).

Figure 2A:
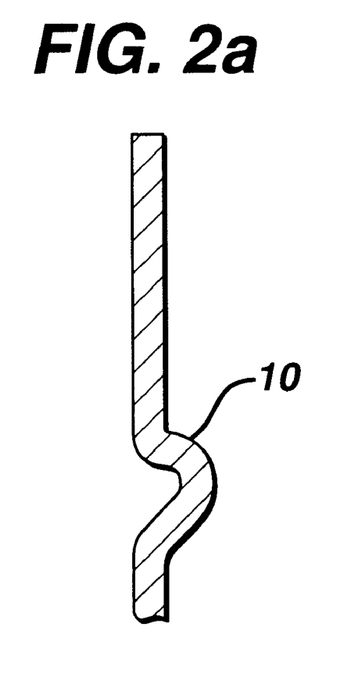
FIGS. 2a and 2b are cross-sectional views of a portion of a battery container wall with swaged supports.
Figure 2B:
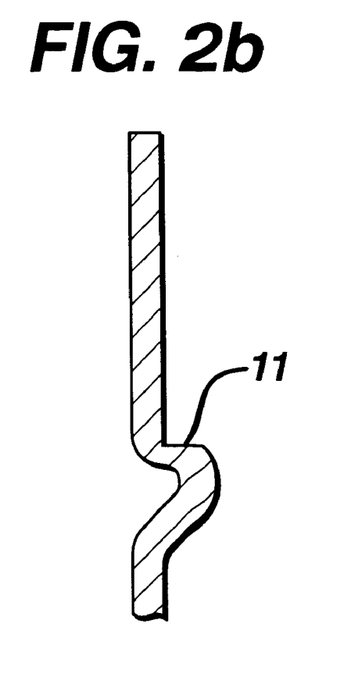

Alternatively, the can may be swaged to provide swaged sections 10, as shown in FIG. 2a. The swaged sections provide indentations in the can, which prevent the top assembly from being pushed too far into the container. If the can is swaged, a secondary sharpening operation can be performed to provide sharply-angled shelves 11, as shown in FIG. 2b.

Figure 3:
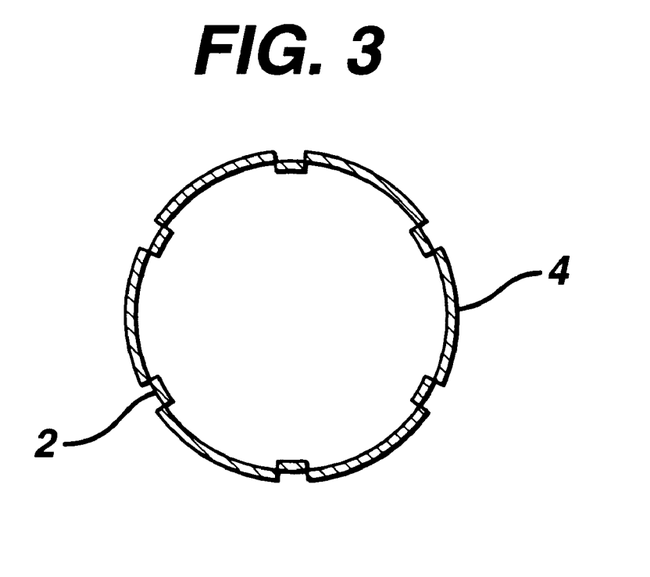
FIG. 3 is a cross-sectional view of a battery container including 6 supports.

Referring to FIG. 3, the container wall 4 has a plurality of discrete supports 2, rather than a continuous support surface. The container preferably has at least three supports, and more preferably has at least four, five, or six supports. In a container for a AAA battery, each support can be 1.0 mm wide, and spaced 5.0 mm from the adjacent supports. The supports can be 2.0 mm from the end of the container.

One or more louvers can be cut into the container. As used herein, a "louver" means an opening, having a leaf, through which air can flow. Generally, the leaf of the louver is slanted relative to the wall of the battery container. To cut louvers, a tool similar to a tool that would be used to remove and produce holes of the same dimensions as the louvers is used. Three of the four cutting edges of the cutting punch are relieved so the cutting edges of the cutting punch and die do not meet. The relief allows the cut panel to remain attached to the container. Single cycle tooling can be used.

For production scale manufacturing, a high speed continuous machine such as a standard metal-working press, can be used. Battery containers with louvers are described in more detail in U.S. Ser. No. 09/374,277, filed Aug. 13, 1999, which is herein incorporated by reference in its entirety.

Figure 4:
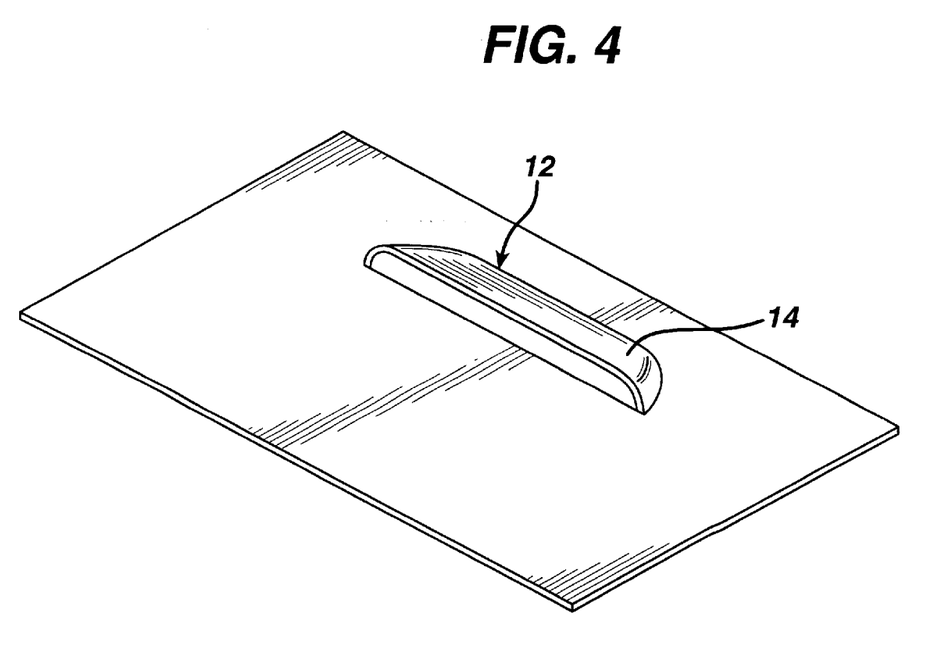
FIG. 4 is a perspective view of a louver.

Referring to FIG. 4, a louver 12 can be open on one side; the flap of displaced material is referred to as a leaf 14. The flap is displaced inwardly such that leaf 14 is located on the inner surface of the container.

Figure 5:
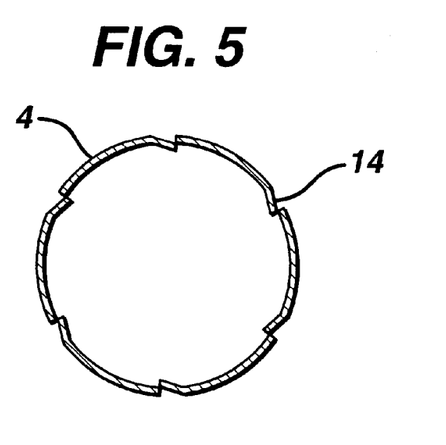
FIG. 5 is a cross-sectional view of a battery container with louvers.

Referring to FIG. 5, the leaves 14 of the louvers are displaced from the original surface of the container wall 4 and extend into the interior of the container.

Figure 6:
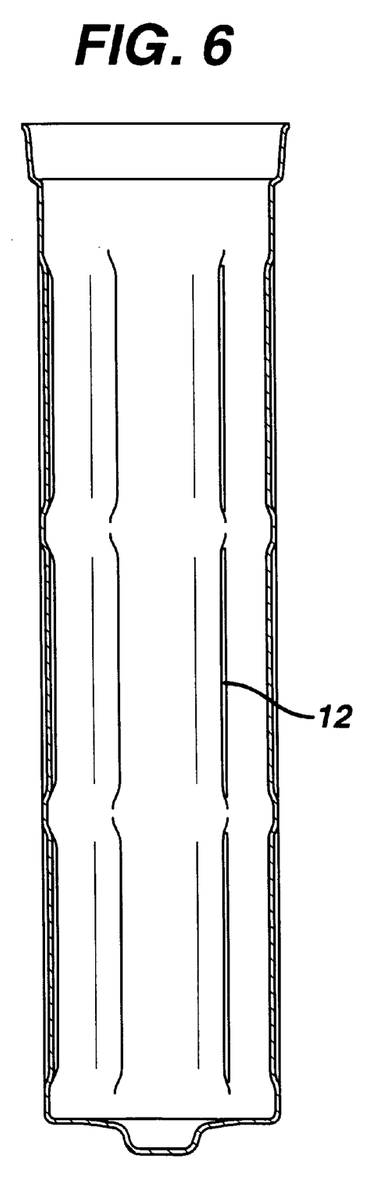
FIG. 6 is a cross-sectional view of a battery container with 6 rows of louvers.

Referring to FIG. 6, the louvers 12 are oriented axially about the battery container. The louvers are spaced apart equally at 60 degree increments around the circumference of the container. To maintain the integrity of the container, the cut is not continuous. Instead, three cuts are made at each axial location. Multiple cuts can be made using a single punch and die by removing portions of the cutting surface of the metalworking punch.

Figure 7A:
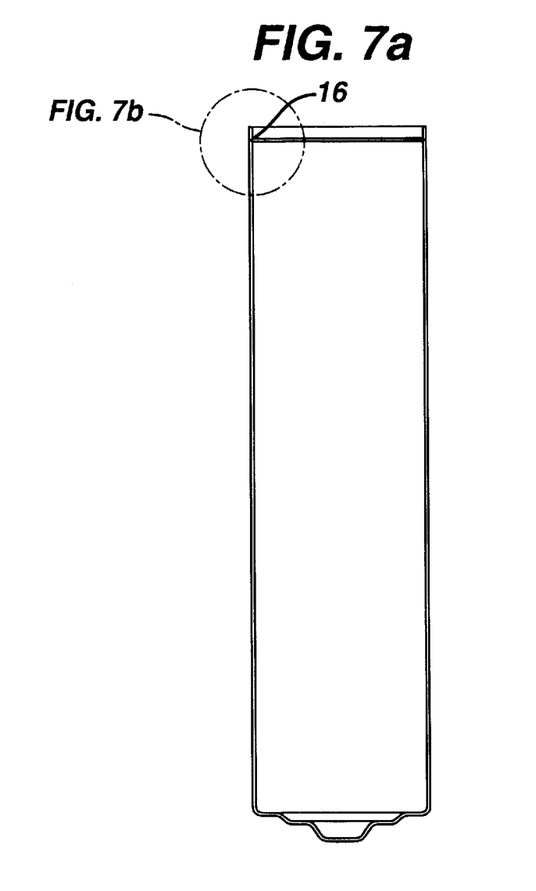
FIGS. 7a and 7b are cross-sectional views of a battery container with a scored wall.
Figure 7B:
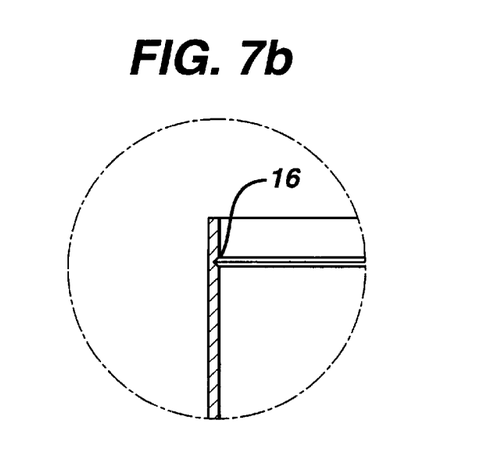

The wall of the container can be scored to weaken the container wall. To score the wall, a cut 16 is made through a portion of the container wall, as shown in FIG. 7a. FIG. 7b shows an expanded view of this cut. When the wall of the container is folded over, it will bend relatively easily at the scored position. The scoring therefore helps to minimize the forces that are transmitted to the contents of the battery container.

Techniques for half-shearing, lancing, swaging, scoring, and forming louvers are described, for example, in Boeselager, Sheet Metal Punching: Collected Articles and Technical Papers (1993). In addition, methods for cutting and punching holes of a variety of shapes are described in this reference.

The methods described above can also be used to prepare prismatic, square, or rectangular batteries, as well as cylindrical batteries.

The cathode of the battery includes a current collector, such as a wire screen. The current collector can be formed into, for example, a tube. An active cathode mixture is deposited on this tube. This mixture includes a binder, carbon particles, and a catalyst for reducing peroxide. A useful binder includes one formed from polytetrafluoroethylene (PTFE) particles. Useful catalysts include manganese oxides, such as $Mn_2O_3$, $Mn_3O_4$, and $MnO_2$, that can be prepared, for example, by heating manganese nitrate or by reducing potassium permanganate. The outside of this tube can be covered by a PTFE membrane. The membrane helps maintain a consistent humidity level in the cell. The membrane also helps to prevent the electrolyte from leaking out of the cell and $CO_2$ from leaking into the cell.

The batteries of the invention are then assembled as follows. The cathode tube, wrapped with the PTFE membrane, is placed in the container. The cathode current collector must electrically contact the bottom of the container. Electrical contact may be made by providing direct physical contact between the cathode current collector and the bottom of the container, for example, by welding the current collector to the bottom of the container. Alternatively, a conductive tab can be attached to both the current collector and to the bottom of the container.

After the cathode tube is inserted, a separator is placed in the container. The separator can be a porous, electrically insulating polymer, such as polypropylene, that allows the electrolyte to contact the cathode. The inner cavity formed by the separator is then filled with anode gel.

The anode gel contains a mixture of zinc and electrolyte. The mixture of zinc and electrolyte can include a gelling agent that can help prevent leakage of the electrolyte from the cell and helps suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety.

The particles of the zinc can be spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0–3 wt % on 60 mesh screen;
40–60 on 100 mesh screen;
30–50 wt % on 200 mesh screen;
0–3 wt % on 325 mesh screen; and
0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, 4,590,227, or U.S. Pat. No. 4,507,438.

In certain embodiments, the anode gel can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

After the anode gel has been inserted into the container, a pre-assembled top assembly is placed on the top of the container.

Figure 8A:
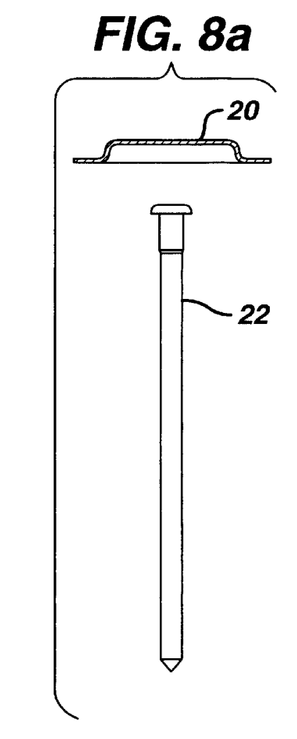
FIGS. 8a–e are cross-sectional views of components for a top assembly for a battery.
Figure 8B:
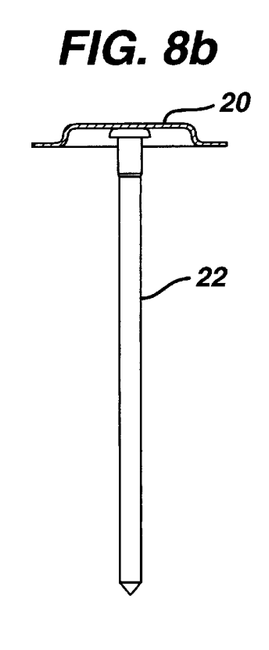
Figure 8C:
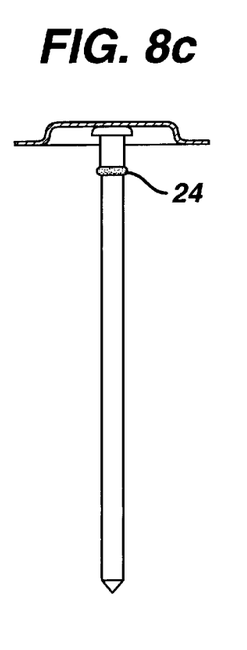

The top assembly for the battery includes a negative end cap 20 and current collector 22, which are welded together, as shown in FIGS. 8*a* and 8*b*. A material such as an asphalt adhesive 24 is placed on the current collector, as shown in FIG. 8*c*.

A potting seal 26 is injection molded. The potting seal includes a potting cavity 28. Useful materials for making the potting seal include nylon 6/6 resins (available from DuPont, Wilmington, Del., under the name Zytel 101F, or from Nylon Corporation of America, under the designation Nycoa 520), and nylon 612 resins (available from DuPont). The potting seal can effectively seal a cathode that has dimensional variations near the end and around the top surface. For example, a potting seal can be used to provide a good seal, even when the top edge of the cathode is not perfectly flat, or the thickness of the cathode varies.

Figure 8D:
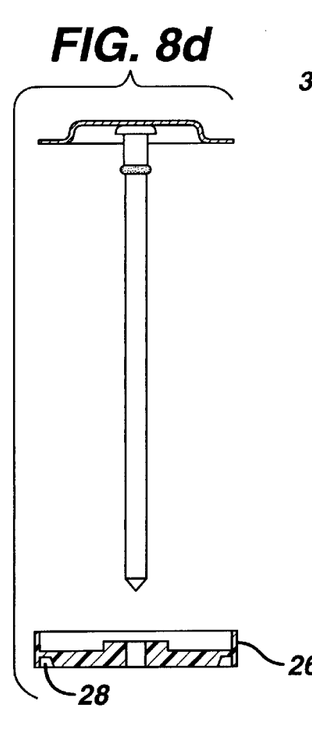
Figure 8E:
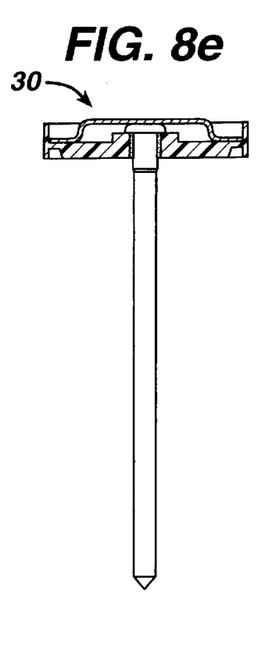

The current collector 22 is inserted into the potting seal 26, as shown in FIGS. 8*d* and 8*e* to complete the top assembly 30.

Figure 9A:
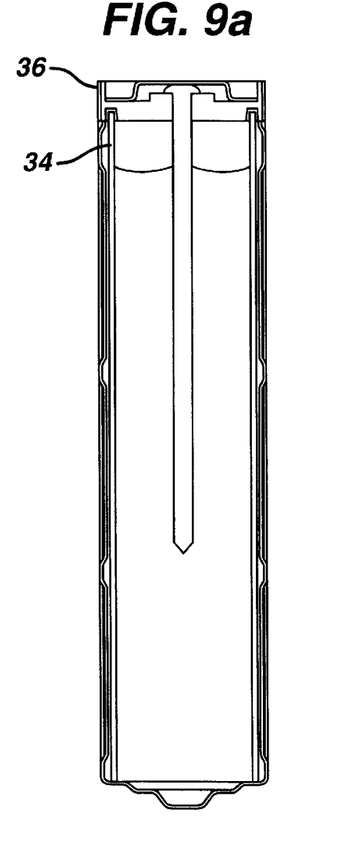
FIGS. 9a–c are cross-sectional views of battery containers.

When the battery is assembled, an adhesive 32 is dispensed in the potting cavity 28. Useful adhesives include hot melt polyamides, e.g., MACROMELT® 6329, available from Henkel Adhesives (Elgin, Ill.) and asphalt sealants, e.g., Asphalt B1128, available from BiWax Corp (Commerce City, Colo.). The top assembly 30 is then inserted into the battery container until the top assembly contacts the half-sheared surface or swaged portion, as shown in FIG. 9*a*.

As is discussed above, the supports prevent the top assembly from being inserted into the container too far, thereby damaging the cathode 34. The supports should be located at a position such that the edges of the top seal contact the support surface before the cathode contacts the bottom of the potting cavity 28. For example, when a AAA cell is assembled according to the methods described herein, there is at least about 0.010 to 0.015 inch between the top of the cathode and the bottom of the potting cavity.

Figure 9B:
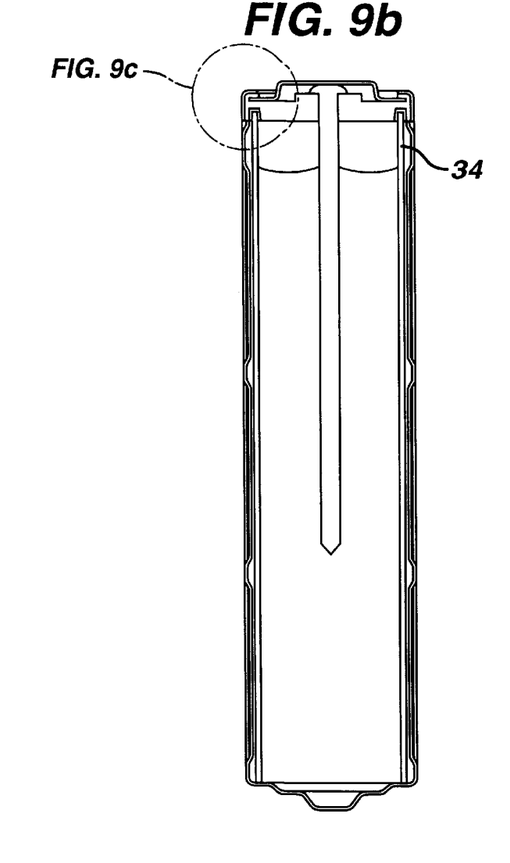

Referring to FIG. 9*b*, the upper external periphery 36 (i.e., the lip) of the container is then folded over the top assembly in a crimping operation to seal the top assembly at the top of the cell. The lip generally folds along the score on the inner container wall.

To carry out this sealing operation, a variety of machines can be used, including, but not limited to arbor presses, 5-ton flywheel power presses, hydraulic presses, and pneumatic presses.

In one embodiment, the pressworking tool used for this operation can have an upper half and a lower half aligned by guide pins and bushings. The lower half of the tool is simply a nest or cavity that constrains the unclosed cell and locates the unclosed cell in alignment with the upper tooling. In operation, the unclosed cell is placed into the cavity with the unclosed end facing up. The upper tool consists of two cylindrical sleeves. As the press is cycled, the upper tooling lowers and the outer sleeve passes over the open end of the cell. The inner sleeve is approximately the same size as the outside diameter of the can. The lead end of the inner sleeve has a radius that meets the unclosed end and curls the lip inward toward the centerline of the cell. The outer sleeve acts to guide or align the inner sleeve and can, and to minimize any bulging that could occur in the can. Preferably, 2–5 ton presses are used to seal the batteries.

Figure 9C:
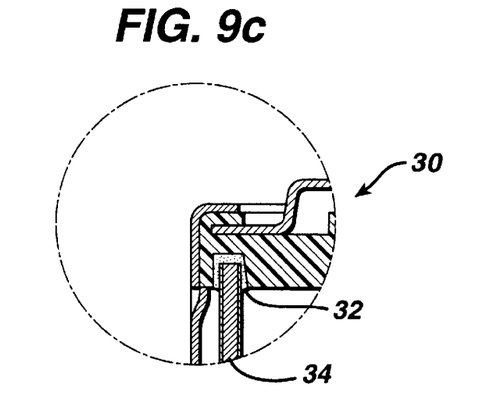

After the sealing process, the top seal is captivated between the support surface and the folded portion of the container, as shown in FIG. 9*c*, which is an expanded view of the upper left corner of FIG. 9*b*. The cathode contacts the adhesive contained in the potting cavity, but does not contact the bottom of the potting cavity.

All publications and patents mentioned in this application are herein incorporated by reference to the same extent as if each individual publication or patent was specifically and individually indicated to be incorporated by reference.

Other embodiments are within the scope of the following claims.

What is claimed is:

1. A metal-air battery having a positive end and a negative end, the battery comprising:

(a) a container having a plurality of louvers;
(b) an anode;
(c) a cathode;

(d) a separator between the anode and the cathode;

(e) a top assembly in contact with a plurality of supports in a wall of the container, the supports including discrete support structures spaced from each other.

2. The battery of claim 1, wherein the top assembly is located toward the positive end of the battery.

3. The battery of claim 1, wherein the top assembly is located toward the negative end of the battery.

4. The battery of claim 1, wherein the battery is a cylindrical battery.

5. The battery of claim 1, wherein the battery is a prismatic battery.

6. The battery of claim 1, wherein the battery is a square battery.

7. The battery of claim 1, wherein the battery is a rectangular battery.

8. The battery of claim 1, wherein the top assembly includes a potting seal.

9. The battery of claim 8, wherein the potting seal includes a cavity having a bottom, wherein the cathode does not contact the bottom of the cavity.

10. The battery of claim 1, wherein the discrete elements are evenly spaced from each other around the periphery of the container.

11. The battery of claim 1, wherein the container has at least three supports.

12. The battery of claim 1, wherein the container has at least four supports.

13. The battery of claim 1, wherein the container has at least six supports.

14. The battery of claim 1, wherein, relative from the positive end to the negative end, the supports extend inwardly into the interior of the container.

15. The battery of claim 9, further comprising an adhesive in the cavity.

* * * * *